(12) United States Patent
Spellman et al.

(10) Patent No.: US 11,279,276 B2
(45) Date of Patent: Mar. 22, 2022

(54) BOAT TOWING AUXILIARY LIGHT WITH SHAFT, POWER SOURCE, AND BRACE

(71) Applicants: Patrick Spellman, Drexel Hill, PA (US); Thomas Bonner, Chester, PA (US)

(72) Inventors: Patrick Spellman, Drexel Hill, PA (US); Thomas Bonner, Chester, PA (US)

( * ) Notice: Subject to any disclaimer, the term of this patent is extended or adjusted under 35 U.S.C. 154(b) by 0 days.

(21) Appl. No.: 17/220,067

(22) Filed: Apr. 1, 2021

(65) Prior Publication Data

US 2021/0309143 A1 Oct. 7, 2021

Related U.S. Application Data

(60) Provisional application No. 63/004,101, filed on Apr. 2, 2020.

(51) Int. Cl.
*B60Q 1/00* (2006.01)
*B60Q 1/26* (2006.01)

(52) U.S. Cl.
CPC ......... *B60Q 1/2657* (2013.01); *B60Q 1/0094* (2013.01); *B60Q 1/2607* (2013.01)

(58) Field of Classification Search
CPC combination set(s) only.
See application file for complete search history.

(56) References Cited

U.S. PATENT DOCUMENTS

| 5,335,149 | A | 8/1994 | Evans |
| 5,544,022 | A | 8/1996 | Blackard |
| 6,155,195 | A | 12/2000 | Nirenberg |
| 6,386,740 | B1 | 5/2002 | Grissom |
| 7,444,953 | B1 | 11/2008 | Player |
| 10,378,739 | B2 * | 8/2019 | Harvey ................. F21V 17/007 |
| 11,187,388 | B2 * | 11/2021 | Zhou ................... F21V 21/0824 |
| 2004/0252515 | A1 * | 12/2004 | Opolka ..................... F21V 3/00 362/410 |
| 2007/0171031 | A1 | 7/2007 | Hastings |

\* cited by examiner

*Primary Examiner* — Robert J May
(74) *Attorney, Agent, or Firm* — Boudwin Intellectual Property; Daniel Boudwin

(57) ABSTRACT

A boat towing auxiliary light is provided. The device includes an elongated shaft having an upper end opposite a lower end. A light assembly is affixed to the upper end of the elongated shaft. A pair of notches are disposed within the lower end of the elongated shaft. A brace removably securable within the pair of notches. A power source is disposed within the elongated shaft, wherein the power source is operably connected to the light assembly. A control is disposed on the elongated shaft, wherein the control selectively toggles the light assembly between an activated state and a deactivated state. In some embodiments, a wireless controller is disposed within the elongated shaft and operably connects the light assembly with a remote electronic device, wherein the remote electronic device selectively toggles the light assembly between an activated state and a deactivated state.

18 Claims, 5 Drawing Sheets

BOAT TOWING AUXILIARY LIGHT WITH SHAFT, POWER SOURCE, AND BRACE

CROSS REFERENCE TO RELATED APPLICATIONS

This application claims the benefit of U.S. Provisional Application No. 63/004,101 filed on Apr. 2, 2020. The above identified patent application is herein incorporated by reference in its entirety to provide continuity of disclosure.

BACKGROUND OF THE INVENTION

The present invention relates to towing lights. More particularly, the present invention pertains to a boat towing auxiliary light that securely affixes to a boat or other towed vehicle to increase visibility of the towed vehicle.

Many individuals own boats or other vehicles that must be towed from one location to another for use. When towing a boat, the towing vehicle's brake lights, or brake lights associated with the trailer, may not be visible. Auxiliary lights are often used to increase visibility of the towed vehicle, however typical auxiliary lights utilize magnetic fastening mechanisms to secure the auxiliary lights to the towed vehicle. These magnetic fastening mechanisms are often weak and can be easily dislodged during transport via uneven road surfaces, sharp braking, or other common driving circumstances. When the auxiliary lights are dislodged, they may impact following vehicles or become roadway obstacles, which can lead to traffic collisions. Additionally, many auxiliary light systems fail to signal brakes, turn signals, or other actions of the towing vehicle, which can prevent other drivers from recognizing when the towing vehicle is slowing or turning. Therefore, a towing auxiliary light that can securely affix to a boat or other towed vehicle to increase visibility thereof is desired.

In light of the devices disclosed in the known art, it is submitted that the present invention substantially diverges in design elements from the known art and consequently it is clear that there is a need in the art for an improvement to existing towing lights. In this regard, the instant invention substantially fulfills these needs.

SUMMARY OF THE INVENTION

In view of the foregoing disadvantages inherent in the known types of towing lights now present in the known art, the present invention provides a towing auxiliary light wherein the same can be utilized for providing convenience for the user when increasing visibility of a towed boat or other vehicle in a secure manner.

The present system comprises an elongated shaft having an upper end opposite a lower end. A light assembly is affixed to the upper end of the elongated shaft. A pair of notches are disposed within the lower end of the elongated shaft. A brace removably securable within the pair of notches. A power source is disposed within the elongated shaft, wherein the power source is operably connected to the light assembly. A control is disposed on the elongated shaft, wherein the control selectively toggles the light assembly between an activated state and a deactivated state. In some embodiments, a wireless controller is disposed within the elongated shaft and operably connects the light assembly with a remote electronic device, wherein the remote electronic device selectively toggles the light assembly between an activated state and a deactivated state.

In some embodiments, the light assembly is pivotally affixed to the upper end. In another embodiment, the upper end is angularly offset relative to a longitudinal axis of the elongated shaft. In other embodiments, the upper end is disposed orthogonally to a ground surface when the elongated shaft is secured within an opening disposed on a towed vehicle. In yet another embodiment, the brace comprises an arcuate structure. In some embodiments, an elastic cord is disposed within the elongated shaft, wherein the elastic cord is affixed to a center of the brace. In another embodiment, the brace further comprises an aperture on opposing ends of the brace. In other embodiments, a central portion of the elongated shaft comprises a larger diameter than a remainder of the elongated shaft. In yet another embodiment, an adaptor is affixed to the elongated shaft and is configured to operably connect the light assembly to a vehicle control system, wherein the light assembly is activated via signals received by the vehicle control system corresponding to activating vehicle brakes and vehicle turn signals. In some embodiments, an application is installed on the remote elongated device, wherein the application includes a plurality of controls configured to activate the light assembly to correspond to activating vehicle brakes and vehicle turn signals.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
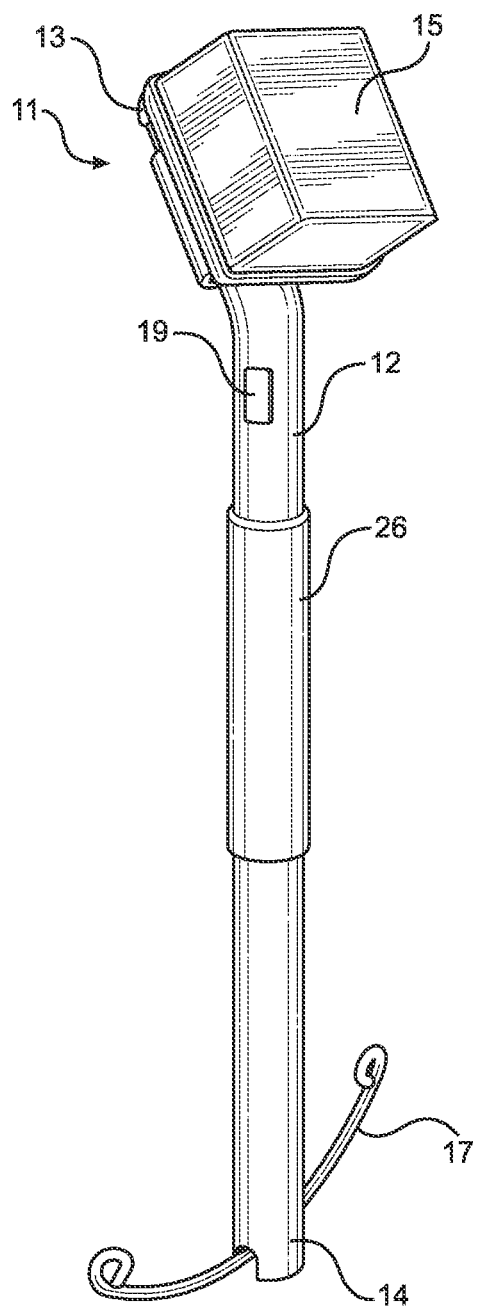
FIG. 1 shows a perspective view of an embodiment of the boat towing auxiliary light.

Reference is made herein to the attached drawings. Like reference numerals are used throughout the drawings to depict like or similar elements of the boat towing auxiliary light. The figures are intended for representative purposes only and should not be considered to be limiting in any respect.

According to some embodiments, the operations, techniques, and/or components described herein can be implemented as (i) a special-purpose computing device having specialized hardware and a logic hardwired into the computing device to persistently perform the disclosed operations and/or techniques or (ii) a logic that is implementable on an electronic device having a general purpose hardware processor to execute the logic and a computer-readable medium, e.g. a memory, wherein implementation of the logic by the processor on the electronic device provides the electronic device with the function of a special-purpose computing device.

In the interests of economy, the present disclosure refers to "a computer-readable medium," "processor," and so on. However, this should not be read as limiting in any way as the present disclosure contemplates embodiments of the present invention utilizing "one or more computer-readable media," "one or more processors," and so on. Unless specifically limited to a single unit, "a" is intended to be equivalent to "one or more" throughout the present disclosure.

As referred to herein, the term "electronic device" refers to any computing device that includes at least a display screen and an input mechanism. The computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more general purpose hardware processors programmed to perform such features of the present disclosure pursuant to program instructions in firmware, memory, other storage, or a combination. Such computing devices can also combine custom hard-wired logic, ASICs, or FPGAs with custom programming to accomplish the technique and other features of the present disclosure. The computing devices can be desktop computer systems, laptops, cell phones, tablets, networking devices, or any other device that incorporates hard-wired and/or program logic to implement the techniques and other features of the present disclosure.

Figure 4:
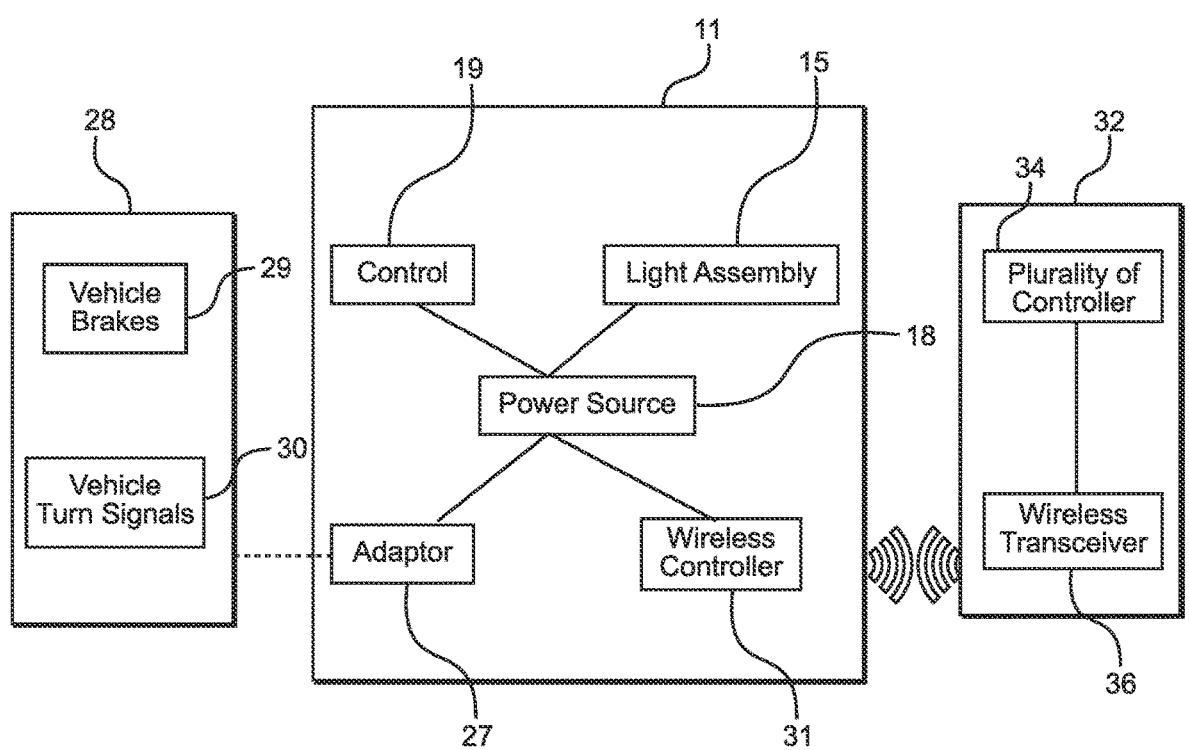
FIG. 4 shows a schematic view of an embodiment of the boat towing auxiliary light.

Referring now to FIG. 1, there is shown a perspective view of an embodiment of the boat towing auxiliary light. The boat towing auxiliary light 11 comprises an elongated shaft 12 having an upper end 13 opposite a lower end 14. A light assembly 15 is disposed on the upper end 13, wherein the light assembly 15 is configured to selectively activate or deactivate to increase visibility of a towed vehicle, such as a boat (as shown in FIC. 5, 22), during transport. The light assembly 15 is contemplated to comprise an independent light source configured to replicate a typical vehicle rear light. In some embodiments, the light assembly 15 comprises an LED array, whereas in other embodiments, the light assembly 15 includes another light source. In the illustrated embodiment, the upper end 13 is disposed at an angle relative to the remainder of the elongated body 12, such that the light assembly 15 is disposed substantially perpendicular to a ground or road surface when the boat towing auxiliary light 11 is affixed to the towed vehicle. In this manner, the visibility of the light assembly 15 is maximized during operation. In the shown embodiment, a control 19 is disposed on the elongated body 12, wherein the control 19 is operably connected to the light assembly 15, such that the control 19 selectively activates or deactivates the light assembly 15 when actuated. In alternate embodiments, the light assembly 15 is operably connected to a digital control means, such as a remote electronic device (as shown in FIG. 4, 32) in wireless communication with the light assembly 15.

A brace 17 is disposed on the lower end 14 of the elongated body 12, wherein the brace 17 is configured to retain the boat towing auxiliary light 11 within an opening disposed on the towed vehicle. In this manner, uneven road surfaces or other obstacles causing bumps or shifts during transport fail to dislodge the elongated body 12 from the boat opening. In the illustrated embodiment, the brace 17 comprises an arcuate form factor such that opposing ends of the brace 17 engage a lower side of the opening into which the elongated body 12 is inserted, such that the elongated body 12 is further retained therein. In the illustrated embodiment, a central portion 26 of the elongated body 12 comprises a wider diameter than a remainder of the elongated body 12. The widened central portion 26 serves to prevent the elongated body 12 from being inserted into the towed vehicle opening, such as a fishing rod holder (as shown in FIG. 5, 21), beyond a desired depth, such that the light assembly 15 is disposed at a sufficient height above the towed vehicle to increase visibility of the light assembly 15.

Figure 2:
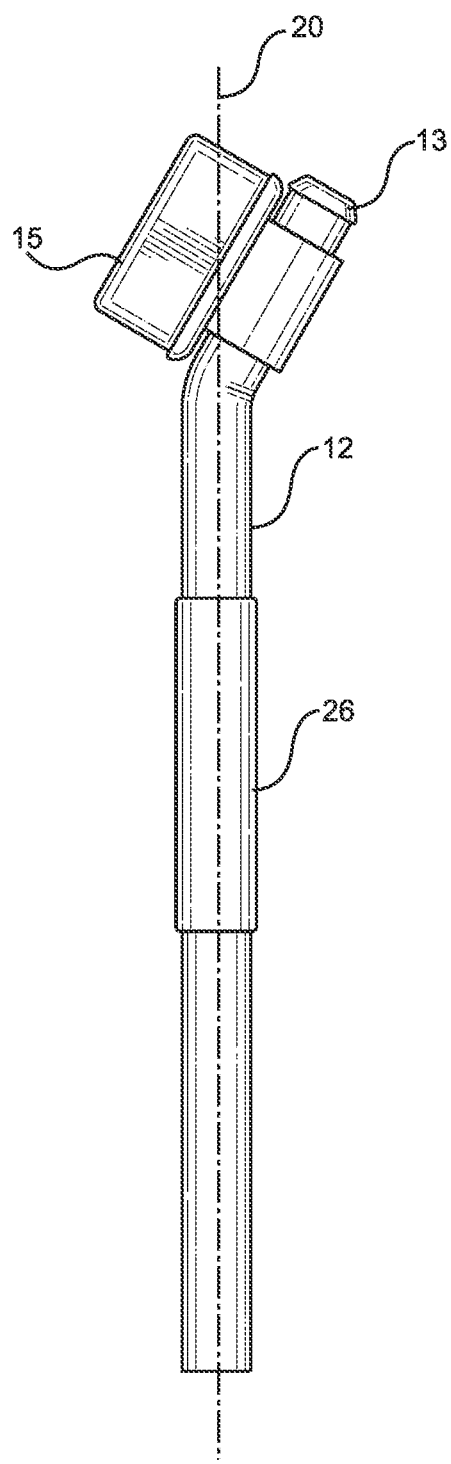
FIG. 2 shows a side view of an embodiment of the boat towing auxiliary light.

Referring now to FIG. 2, there is shown a side view of an embodiment of the boat towing auxiliary light. The upper end 13 is disposed at an angle relative to a longitudinal axis 20 of the elongated body 12, wherein the angle is sufficient to dispose the light assembly 15 substantially perpendicular to the ground surface when the elongated body 12 is inserted into the towed vehicle opening. In some embodiments, the angle is contemplated to comprise an equivalent angle to that of a fishing rod cylinder (as shown in FIG. 5, 35) extending from below the fishing rod holder, such that when the elongated body 12 is inserted therein, the upper end 13 is disposed vertically to increase visibility of the light assembly 15. In some embodiments, the light assembly 15 is pivotally affixed to the upper end 13, such that the user can selectively position the light assembly 15 to increase visibility to drivers behind or alongside the towed vehicle. In the illustrated embodiment, the central portion 26 of the elongated body 12 is disposed coaxially with the longitudinal axis 20 below the upper end 13, such that the upper end 13 is held aloft above the opening in which the elongated body 12 is inserted.

Figure 3:
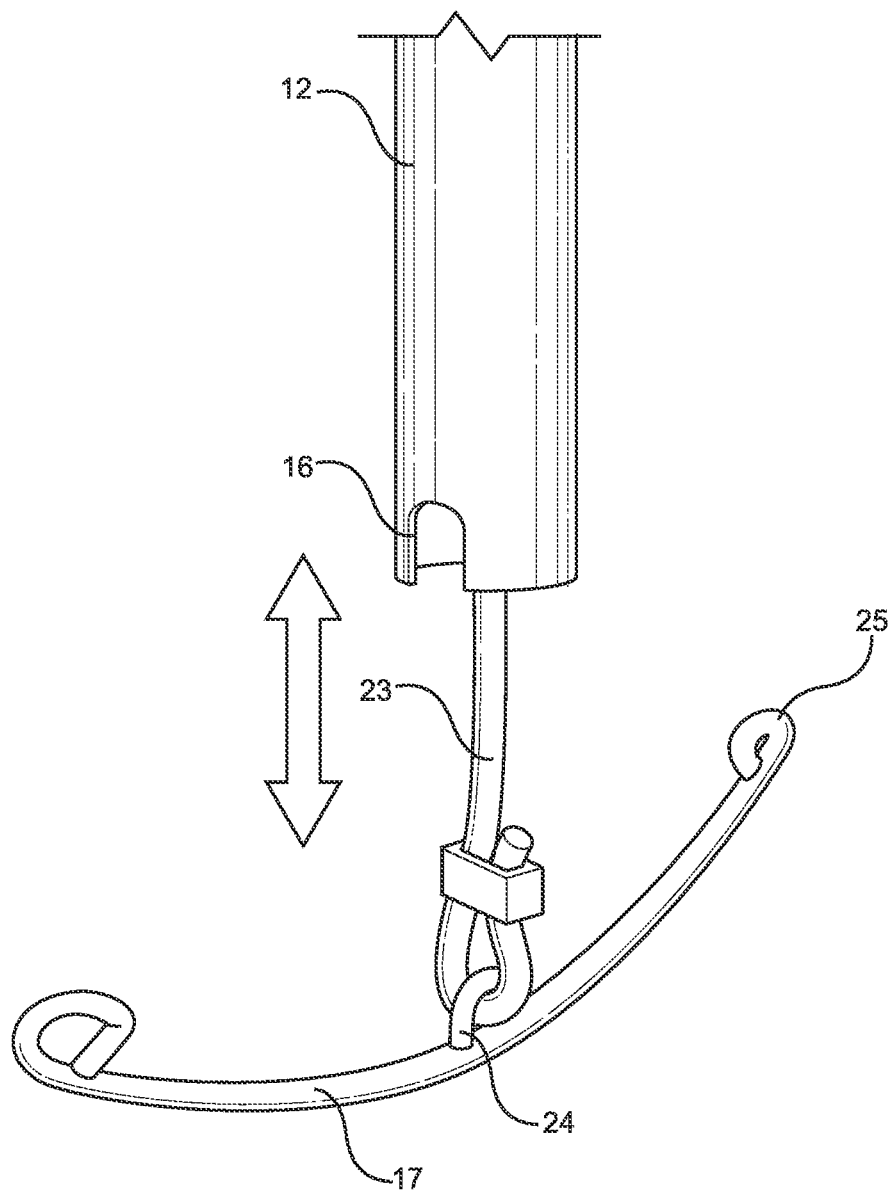
FIG. 3 shows a close-up view of the lower end of an embodiment of the boat towing auxiliary light.

Referring now to FIG. 3, there is shown a close-up view of the lower end of an embodiment of the boat towing auxiliary light. In the shown embodiment, the brace 17 is removably securable within a pair of notches 16 disposed on the lower end of the elongated body 12. The pair of notches 16 are disposed in linear alignment with each other, such that the brace 17 can secure therethrough. In some embodiments, the pair of notches 16 are dimensioned to frictionally engage the brace 17 therein, such that when the user secures the elongated body 12 within the towed vehicle opening, the user can secure the brace 17 within the pair of notches 16 to prevent the elongated body 12 from exiting the towed vehicle opening. In the shown embodiment, an elastic cord 23 is affixed within the elongated body 12 and is secured to the brace 17 along a center 24 thereof via a bracket. The elastic cord 23 allows the brace 17 to be selectively moved between an extended position and a retracted position, wherein the retracted position the brace 17 is disposed within the pair of notches 16 disposed on the lower end. In such embodiments, the brace 17 is biased towards the retracted position via the elastic cord 23, such that the user can position the brace 17 for insertion through the towed vehicle opening and upon passing through the opening, the brace 17 retracts to retain the elongated body 12 therein. In the illustrated embodiment, a pair of openings 25 are disposed on opposing ends of the brace 17, wherein the pair of openings 25 can be utilized to secure a tiedown or other line to the brace 17 to further secure the elongated body 12 to the towed vehicle.

Referring now to FIG. 4, there is shown a schematic view of an embodiment of the boat towing auxiliary light. In the shown embodiment, the boat towing auxiliary light 11 further comprises an internal power source 18 is operably connected to the light assembly 15 and the control 19. In some embodiments, the power source 18 is disposed within the light assembly 15 to allow a user to readily replace the light assembly 15 as needed. In one embodiment, the power source 18 is further operably connected to an adaptor 27, wherein the adaptor 27 is configured to operably connect the boat towing auxiliary light 11 to a vehicle control system 28 of a towing vehicle. In this manner, the adaptor 27 translates signals received from the vehicle control system 28 indicating when the towing vehicle activates vehicle brakes 29 or vehicle turn signals 30 to selectively activate or deactivate the light assembly 15 to replicate the towing vehicle rear lights. Accordingly, the boat towing auxiliary light 11 provides other drivers with details of the activities of the towing vehicle that may be obscured by the towed vehicle. In such embodiments, a second boat towing auxiliary light 11 can be utilized on an opposing side of the towed vehicle to allow the vehicle control system 28 to activate the light assembly 15 on a first side of the towed vehicle to replicate a particular vehicle turn signal 30 and activate the light assembly 15 on an opposing side of the towed vehicle to replicate the remaining vehicle turn signal 30. In some embodiments, the adaptor 27 comprises a direct wired connection with the vehicle control system 28 of the towing vehicle.

In an alternate embodiment, the boat towing auxiliary light 11 comprises a wireless controller 31 in wireless communication with a wireless transceiver 36 of a remote electronic device 32, such as a smartphone, tablet, or the like. In such embodiments, the remote electronic device 32 includes an application installed thereon, wherein the application further comprises a plurality of controls 34 configured to selectively activate and deactivate the light assembly 15 in a variety of preprogrammed patterns. For example, the plurality of controls 34 can include a brake light control, a left turn signal control, and a right turn signal control, wherein the user can selectively activate the light assembly 15 to replicate the traditional appearance of a vehicle braking or signaling a turn. In such embodiments, the remote electronic device 32 can be paired with at least two boat towing auxiliary lights 11 disposed on opposing sides of the towed vehicles, wherein the left turn signal control activates the light assembly 15 of a first auxiliary light and the right turn signal control activates the light assembly 15 of a second auxiliary light. In further embodiments, other traditional vehicle rear light patterns can be replicated by the boat towing auxiliary light 11 via actuation of a corresponding control of the plurality of controls 34, such as hazard lights.

Figure 5A:
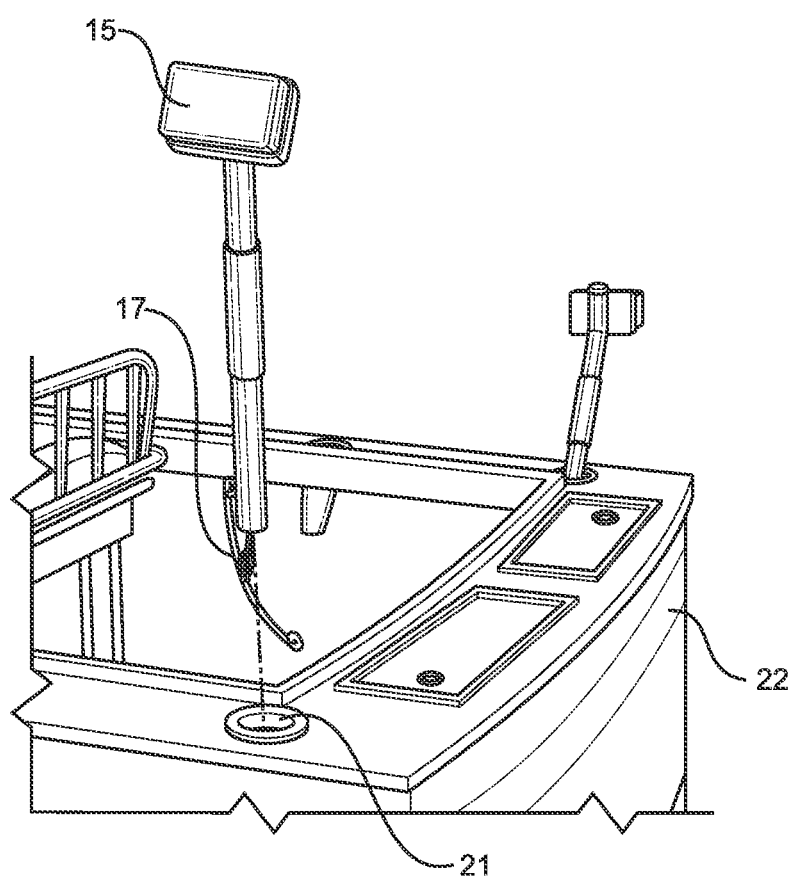
FIG. 5A shows a perspective view of an embodiment of the boat towing auxiliary light in use.
Figure 5B:
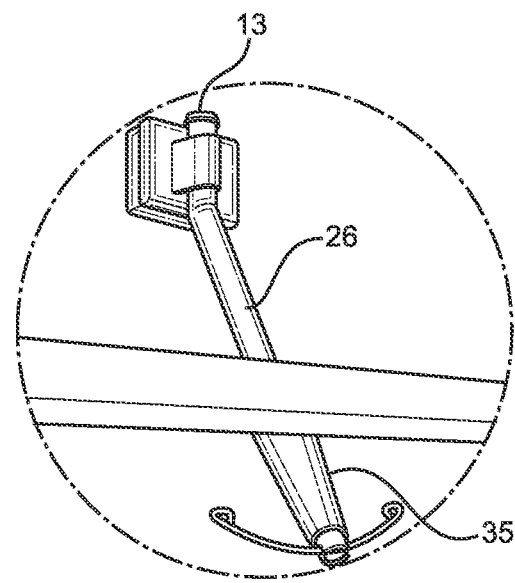
FIG. 5B shows a perspective view of an embodiment of the boat towing auxiliary light affixed within a fishing rod holder.

Referring now to FIGS. 5A and 5B, there is shown a perspective view of an embodiment of the boat towing auxiliary light in use and a perspective view of an embodiment of the boat towing auxiliary light affixed within a fishing rod holder, respectively. In one use, the boat towing auxiliary light can be installed in an existing opening of a towed vehicle, such as the fishing rod holder 21 of a boat 22. In the shown embodiment, the fishing rod holder 21 further comprises a fishing rod cylinder 35 extending from a lower side of the fishing rod holder 21, the fishing rod cylinder 35 typically configured to stabilize a fishing rod therein. In such embodiments, the central portion 26 of the elongated body comprises a diameter greater than that of the fishing rod cylinder 35 to prevent the boat auxiliary light from being inserted beyond a desired depth. During installation, the user can extend the brace 17 from the lower end of the elongated body via the elastic cord, wherein the brace 17 can be angled to allow the elongated body to be inserted into the fishing rod holder 21. Once the device is inserted through the fishing rod holder, the brace 17 retracts to rest perpendicular to the lower end of the elongated body, thereby preventing the boat towing auxiliary light from being dislodged from the fishing rod holder 21 without user intervention. When properly installed, the light assembly 15 disposed on the upper end 13 of the elongated body is disposed substantially perpendicular to the ground surface, thereby increasing visibility thereof. In some embodiments, the user can further position the light assembly 15 via pivoting the light assembly about the upper end 13 to ensure that drivers behind and alongside the boat 22 can visualize the light assembly 15. Once installed, the user can either directly control the light assembly 15 via actuation of a physical control, operably connecting the light assembly 15 to the towing vehicle control system, or actuation of controls disposed on a remote electronic device. In this manner, the user can selectively activate or deactivate the light assembly 15 to increase visibility and inform other drivers of vehicle braking, turning, or other roadway activities.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A boat towing auxiliary light, comprising:
    an elongated shaft having an upper end opposite a lower end;
    wherein the upper end is angularly offset relative to a longitudinal axis of the elongated shaft;
    a light assembly affixed to the upper end of the elongated shaft;
    a pair of notches disposed within the lower end of the elongated shaft;
    a brace removably securable within the pair of notches;
    a power source disposed within the elongated shaft, wherein the power source is operably connected to the light assembly;
    a control disposed on the elongated shaft, wherein the control selectively toggles the light assembly between an activated state and a deactivated state.

2. The boat towing auxiliary light of claim 1, wherein the light assembly is pivotally affixed to the upper end.

3. The boat towing auxiliary light of claim 1, wherein the upper end is disposed orthogonally to a ground surface when the elongated shaft is secured within an opening disposed on a towed vehicle.

4. The boat towing auxiliary light of claim 1, wherein the brace comprises an arcuate shape.

5. The boat towing auxiliary light of claim 1, further comprising an elastic cord disposed within the elongated shaft, wherein the elastic cord is affixed to a center of the brace.

6. The boat towing auxiliary light of claim 1, wherein the brace further comprises an aperture on opposing ends of the brace.

7. The boat towing auxiliary light of claim 1, wherein a central portion of the elongated shaft comprises a larger diameter than a remainder of the elongated shaft.

8. The boat towing auxiliary light of claim 1, further comprising an adaptor affixed to the elongated shaft configured to operably connect the light assembly to a vehicle control system, wherein the light assembly is activated via signals received by the vehicle control system corresponding to activating vehicle brakes and vehicle turn signals.

9. A boat towing auxiliary light, comprising:
an elongated shaft having an upper end opposite a lower end;
wherein the upper end is angularly offset relative to a longitudinal axis of the elongated shaft;
a light assembly affixed to the upper end of the elongated shaft;
a pair of notches disposed within the lower end of the elongated shaft;
a brace removably securable within the pair of notches;
a power source disposed within the elongated shaft, wherein the power source is operably connected to the light assembly;
a wireless controller disposed within the elongated shaft and operably connected to the light assembly;
wherein the wireless controller is in wireless communication with a remote electronic device configured to toggle the light assembly between an activated state and a deactivated state.

10. The boat towing auxiliary light of claim 9, wherein the light assembly is pivotally affixed to the upper end.

11. The boat towing auxiliary light of claim 9, wherein the upper end is disposed orthogonally to a ground surface when the elongated shaft is secured within an opening disposed on a towed vehicle.

12. The boat towing auxiliary light of claim 9, wherein the brace comprises an arcuate shape.

13. The boat towing auxiliary light of claim 9, further comprising an elastic cord disposed within the elongated shaft, wherein the elastic cord is affixed to a center of the brace.

14. The boat towing auxiliary light of claim 9, wherein the brace further comprises an aperture on opposing ends of the brace.

15. The boat towing auxiliary light of claim 9, wherein a central portion of the elongated shaft comprises a larger diameter than a remainder of the elongated shaft.

16. The boat towing auxiliary light of claim 9, further comprising an adaptor affixed to the elongated shaft configured to operably connect the light assembly to a vehicle control system, wherein the light assembly is activated via signals received by the vehicle control system corresponding to activating vehicle brakes and vehicle turn signals.

17. The boat towing auxiliary light of claim 9, further comprising an application installed on the remote electronic device, wherein the application includes a plurality of controls configured to activate the light assembly to correspond to activating vehicle brakes and vehicle turn signals.

18. A boat towing auxiliary light, comprising:
an elongated shaft having an upper end opposite a lower end;
a light assembly affixed to the upper end of the elongated shaft;
a pair of notches disposed within the lower end of the elongated shaft;
a brace removably securable within the pair of notches;
a power source disposed within the elongated shaft, wherein the power source is operably connected to the light assembly;
a control disposed on the elongated shaft, wherein the control selectively toggles the light assembly between an activated state and a deactivated state;
an adaptor affixed to the elongated shaft configured to operably connect the light assembly to a vehicle control system, wherein the light assembly is activated via signals received by the vehicle control system corresponding to activating vehicle brakes and vehicle turn signals.

* * * * *